United States Patent
Holt et al.

(10) Patent No.: US 6,446,865 B1
(45) Date of Patent: Sep. 10, 2002

(54) REFLECTIVE BADGE SECURITY IDENTIFICATION SYSTEM

(75) Inventors: Robert J. Holt, Cornwall-on-Hudson; David J. Haas, Suffern, both of NY (US)

(73) Assignee: Temtec, Inc., Suffern, NY (US)

( * ) Notice: Subject to any disclaimer, the term of this patent is extended or adjusted under 35 U.S.C. 154(b) by 0 days.

(21) Appl. No.: 09/549,393

(22) Filed: Apr. 14, 2000

Related U.S. Application Data

(63) Continuation-in-part of application No. 09/009,408, filed on Jan. 20, 1998, now abandoned, which is a continuation-in-part of application No. 08/718,268, filed on Sep. 20, 1996, now Pat. No. 5,947,369.
(60) Provisional application No. 60/004,090, filed on Sep. 21, 1995.

(51) Int. Cl.[7] ............................................. G06K 5/00
(52) U.S. Cl. ..................... 235/382; 235/382.5; 235/384; 235/380
(58) Field of Search ............................ 235/384, 382, 235/382.5, 380, 375; 705/13, 18; 902/3; 380/23; 382/115

(56) References Cited

U.S. PATENT DOCUMENTS

| | | | | |
|---|---|---|---|---|
| 4,070,584 A | * | 1/1978 | Chartraire et al. | 250/555 |
| 4,079,605 A | * | 3/1978 | Bartels | 70/277 |
| 4,222,662 A | * | 9/1980 | Kruegle | 355/40 |
| 4,432,630 A | * | 2/1984 | Haas | 355/1 |
| 4,958,064 A | * | 9/1990 | Kirkpatrick | 235/384 |
| 4,970,389 A | * | 11/1990 | Danforth et al. | 250/271 |
| 4,972,476 A | * | 11/1990 | Nathans | 380/23 |
| 5,422,473 A | * | 6/1995 | Kamata | 235/384 |
| 5,432,864 A | * | 7/1995 | Lu et al. | 382/118 |
| 5,471,203 A | * | 11/1995 | Sasaki et al. | 340/825 |
| 5,583,507 A | * | 12/1996 | D'Isepo et al. | 342/45 |
| 5,841,886 A | * | 11/1998 | Rhoads | 382/115 |
| 5,949,879 A | * | 9/1999 | Berson et al. | 380/23 |
| 6,085,976 A | * | 7/2000 | Sehr | 235/380 |

FOREIGN PATENT DOCUMENTS

EP 833281 A1 * 4/1998

* cited by examiner

Primary Examiner—Michael G. Lee
Assistant Examiner—Uyen-Chau N. Le
(74) Attorney, Agent, or Firm—Michael E. Zall

(57) ABSTRACT

A security system including a security or identification badge to be worn by a person. The identification badge has a reflective surface that has a predetermined reflective pattern indicating a predetermined identification status of the person wearing the badge. A means is provided for illuminating the reflective surface of the badge with radiation and detecting the reflected radiation from the predetermined reflective pattern. A signal is produced from the detected radiation to indicate the predetermined identification status of the person wearing the badge. Preferably, the badge is illuminated with a visible wavelength of light and the predetermined reflective pattern includes a retroreflective film. Optionally, the reflective surface has a predetermined reflective pattern indicating a predetermined identification status of the person wearing the badge and a means for changing this predetermined reflective pattern to a another predetermined reflective pattern that indicates another predetermined identification status, e.g., an electromagnetic energy source that radiates onto the reflective surface of the badge. Additionally, the a means for illuminating the reflective surface of the badge with radiation can also illuminate the physical characteristic of the person wearing the badge and the means for detecting the reflected radiation can also detect the reflected radiation from the physical characteristic of the person wearing the badge.

12 Claims, 2 Drawing Sheets

REFLECTIVE BADGE SECURITY IDENTIFICATION SYSTEM

RELATED APPLICATIONS

This application is a continuation in part of application of U.S. Ser. No. 09/009,408 filed on Jan. 20, 1998 now abandoned which is a continuation-in-part application of U.S. Ser. No. 08/718,268 filed Sep. 20, 1996 entitled ELECTROCHEMICAL TIME INDICATOR (3.0-024), now U.S. Pat. No. 5,947,369, which is related to the provisional application U.S. Ser. No. 60/004,090, filed Sep. 21, 1995. All of these applications are incorporated herein by reference.

BACKGROUND OF THE INVENTION

1. Field of the Invention

This invention relates to a security system, and in particular to an identification badge verification system that detects the reflectivity of a security or identification badge to determine, for example, a persons identity.

2. Prior Art

A major problem with temporary identification or security badges is preventing expired, lost and/or uncollected badges from being reused. A known solution to this problem is the use of self expiring badges, i.e., badges that after a period of time indicate thereon that they are expired and that the person does not have access to the secured area. Such time indicators are useful, for example, not only as security badges but also as a means for determining the length of time a perishable item, e.g., food, photographic film, etc., has been on a wholesaler's or retailer's shelf.

Many of these known time indicators, which are generally short term time indicators, are based on the migration of ink from one substrate through another substrate, i.e. in a path perpendicular to the surface of the substrate. After the ink migrates through the substrate(s) it is viewed on a display surface to thereby indicate that the predetermined time has elapsed. Other known time indicators are based on the migration of liquids, jellies or inks through wicks or migration paths to indicate the passage of time. Still other indicators rely primarily upon chemical reactions to cause a visually perceptible change over a desired time period rather than the migration of fluids or compounds.

More specifically:

U.S. Pat. No. 4,212,153 to Kydonieus, et al describes a laminated indicator that changes in a visually perceptible mode with the passage of time. The indicator comprises at least two layers whereby the molecular migration of an agent in an interior layer to the outermost surface of the exterior layer causes a change which is visually perceptible.

U.S. Pat. Nos. 4,432,630, 4,542,982 and 4,779,120 to Haas describe badges with an ambient light sensitive coating thereon which when exposed to ambient light for a specified period of time change to a specified color.

U.S. Pat. No. 4,903,254 to Haas describes a time indicator with a plurality of layers that are adhered together. The indicator has a front part and a rear part. The rear part includes an ink film layer upon a backup layer. At issuance, the front part and rear part are adhered together and the ink migrates from the rear part into the front part.

U.S. Pat. No. 5,058,088 to Haas describes a timing indicator type badge, label or display wherein the relative amount of time that has elapsed from the initial activation of the timing indicator can be easily determined by the progression of a visually perceptible change in color along different areas of the timing indicator. This timing indicator comprises a clear self-adhesive film which is placed over a printed substrate in order to activate the timing indicator. The printed substrate includes a migrating or soluble ink which migrates along the substrate to produce a visual color change.

U.S. Pat. No. 5,107,470 to Pedicano describes a quick acting indicator including a migrating ink that migrates through an opaque layer to display a message. Upon removal of a release paper, a coated indicator portion is brought into contact with a printed base portion, and a printed message migrates through a noncuring layer to display the printed message.

U.S. Pat. No. 5,364,132 Haas et al. describes a reusable self-expiring security identification badge. When the badge is issued, the inked substrate is attached to the base substrate, the inked substrate covering the void indicia area. The overlay substrate is then placed over and attached with the soluble ink of the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

Applicant has discovered, however, that there are several problems associated with these known time dependant self expiring security or identification badges. In particular, long term, e.g., months, years, etc., identification badges that produce a color change to indicate that a predetermined length time has expired, have the following problems or shortcomings:

1. The diffusion of dye molecules cannot be easily controlled in a step function.

2. Barriers that are made of organic and inorganic (non-metallic) materials are difficult to produce and maintain in a stable condition over months and years, i.e., they have a poor shelf-life. More specifically, the thickness and concentration of the various components is difficult to control.

3. Organic and inorganic (non-metallic) barriers cannot be produced in very thin layers, e.g., hundreds or tens of thousands of Angstroms.

Additionally, most known security systems that use identification badges rely on a security guard's or receptionist's visual acuity to inspect the badges of people approaching a designated area. This must be done on an individual basis no matter how many people are passing through the area, is inefficient and laborious.

The present invention is designed to compliment the visual acuity of the security personnel with an automatic system that will, for example, sound an alarm when an invalid or non-verified badge has moved into the area monitored. The present invention is particularly useful in high traffic areas such as airports, public and government buildings, such as courts, or other large facilities where many people move through a confined space in rapid succession.

Several additional U.S. Patents could be relevant to the invention herein; in particular: U.S. Pat. No. 4,258,000 to Obermayer; U.S. Pat. No. 4,661,983 to Knop; U.S. Pat. No. 5,095,194 to Barbanell; U.S. Pat. No. 5,317,987 to Müller et al; U.S. Pat. No. 3,815,084 to Pease; U.S. Pat. No. 4,066,351 to Lindner; U.S. Pat No. 4,085,314 to Schultz; U.S. Pat. No. 4,222,662 to Kruegle; U.S. Pat. No. 4,600,269 to Rass; and U.S. Pat. No. 5,237,164 to Takada. In particular:

U.S. Pat. No. 4,258,000 to Obermayer describes a toxic-monitoring material for monitoring of toxic fluids placed in contact with or exposed to the monitoring material. The material comprises a transparent microporous material that has therein a liquid composition that includes a reactant which reacts with the toxic component to change in color or appearance throughout the material.

U.S. Pat. No. 4,661,983 to Knop describes a technique for determining whether an individual item of sheet material is counterfeit. The sheet material incorporates an authenticating material that exhibits a predetermined macroscopic reflectivity characteristic.

U.S. Pat. No. 5,095,194 to Barbanell describes a holographic credit card with an automated verification system.

U.S. Pat. No. 5,317,987 to Müller, et al. discloses an indicator for display of elapsed times consisting of a base to which a chemical substance is applied and a barrier which is fastened to the base to seal the chemical substance to the base. The barrier may have a legible indication such as a letter. A second chemical substance is applied to the top of the barrier and enclosed by a covering foil. Selective pitting of the barrier permits one or both of the chemical substances to penetrate the barrier to uncover the colored base. The barrier may be constructed from commercial aluminized polymer sheet material. The visible change of the barrier in the chemical substances selected may cause a luminescence reaction which may be detected optoelectronically for automated use of the indicator. Other metal layers on epoxide paper, polyester or polyamide film may be used for the barrier.

U.S. Pat. No. 3,815,084 to Pease describes an optical addressing system for controlled vehicles. The system includes an address strip that is mounted adjacent a desired location. The strip is formed with a plurality of possible code positions selectively coated with retroreflective material to provide an optical binary address designation. The system further includes a plurality of sensing heads carried by the controlled vehicle. Each of the sensing heads serves to direct a collimated light beam toward the address strip and to establish an electrical signal in response to reflection of the light beam by the address strip.

U.S. Pat. No. 4,066,351 to Lindner describes a cube corner type retroreflector. The retroflector includes a transparent solid material or the like wherein retroreflective units of preferably different types are distributable over the entire surface of the reflector. The individual retroreflective units are arranged in rows and all of the cube corner retroreflective units in each row have substantially identical characteristics.

U.S. Pat. No. 4,085,314 to Schultz describes a sheet material useful to form a coded retroreflective mark. The sheet material includes a retroreflective base sheet and a cover film adhered over the base sheet that is precut to form a plurality of removable sections. The cut sections are arranged in a predetermined pattern such that removal of different sections to expose the retroreflective sheeting under the sections provides different codes that may be read and distinguished by photoscanning equipment.

U.S. Pat. No. 4,222,662 to Kruegle describes a photo I.D. card having the photograph, and/or signature, and/or coded indicia of an authorized holder which is visible under ordinary room illumination. The I.D. card also includes a second photograph of the user. The second photograph is in the form of a transparency which is sandwiched between a piece of retroreflective material and an optical filter which is opaque to light of normal intensity and wavelength but which is transparent to infra-red or ultra-violet radiation. Also disclosed is apparatus for reading both the visible and invisible photographs, signature, and data on the card by means of a CCTV system. Any attempt to alter or forge the I.D. card can, thus, be readily detected.

U.S. Pat. No. 4,600,269 to Rass describes a device for holding a reflector within a resilient band. The device may be attached to a garment, e.g., a clip for attaching the device to the pocket of a garment.

U.S. Pat. No. 5,237,164 to Takada describes a card having retroreflective bar codes. The card includes a substrate on which there are provided a first information recording portion formed of a retroreflective material portion of a predetermined pattern and a second information recording portion which can be read out from a remote place.

None of these patents teach or suggest applicants invention and the unexpected benefits derived therefrom.

OBJECTS AND SUMMARY OF THE INVENTION

It is an object of this invention to provide a security system that automatically scans or illuminates a person entering a controlled area to determine if they have attached to them a security identification badge that is valid or expired.

It is a further object of this invention to provide a security identification badge that can be easily scanned or illuminated to determine the badge that is valid or expired.

It is yet another object of this invention to provide a metalized security identification badge that can be easily illuminated and the reflectivity status determined to identify if the badge is valid or expired.

It is a further object of this invention to provide a metalized security identification badge wherein the reflectivity of the badge can be changed by, for example, electromagnetic radiation located outside of the secured area, to indicate a change in the status of the badge from valid to invalid.

It is still a further object of this invention to provide an identification system that can identify the security status of the identification badge and the physical characteristics of the person wearing the badge.

The foregoing objects of this invention are achieved by the security system of this invention. The security system includes a security or identification badge to be worn by a person. The identification badge has a reflective surface that has a predetermined reflective pattern indicating a predetermined identification status of the person wearing the badge. A means is provided for illuminating the reflective surface of the badge with radiation and detecting the reflected radiation from the predetermined reflective pattern. A signal is produced from the detected radiation to indicate the predetermined identification status of the person wearing the badge. Preferably, the badge is illuminated with a visible wavelength of light and the predetermined reflective pattern includes a retroreflective film. Optionally, the reflective surface has a predetermined reflective pattern indicating a predetermined identification status of the person wearing the badge and a means for changing this predetermined reflective pattern to a another predetermined reflective pattern that indicates another predetermined identification status, e.g., an electromagnetic energy source that radiates onto the reflective surface of the badge. Additionally, the means for illuminating the reflective surface of the badge with radiation can also illuminate the physical characteristic of the person wearing the badge and the means for detecting the reflected radiation can also detect the reflected radiation from the physical characteristic of the person wearing the badge.

DESCRIPTION OF THE PREFERRED EMBODIMENTS

Figure 1:
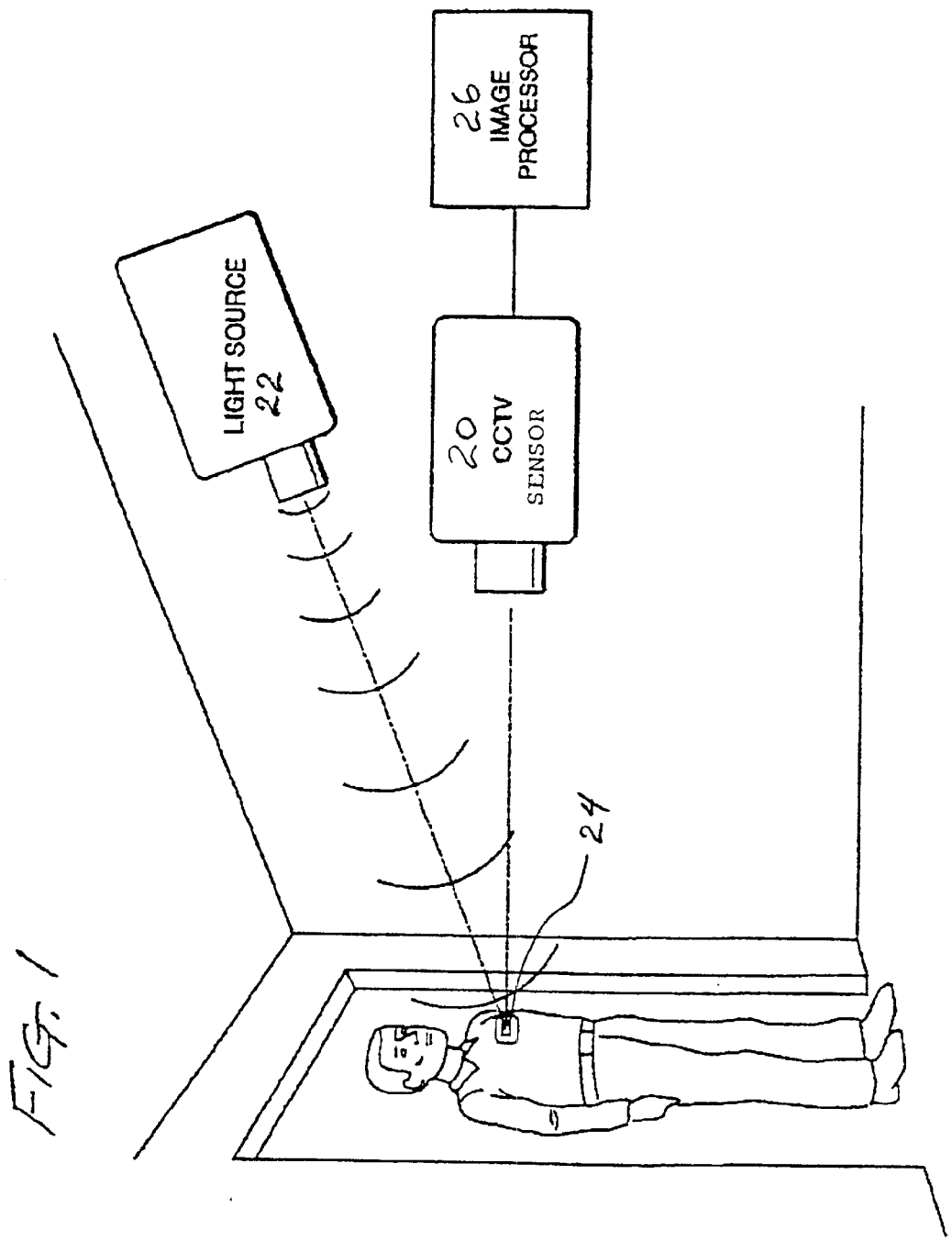
FIG. 1 shows the identification badge and system of this invention in use by person entering a controlled area.
Figure 2:
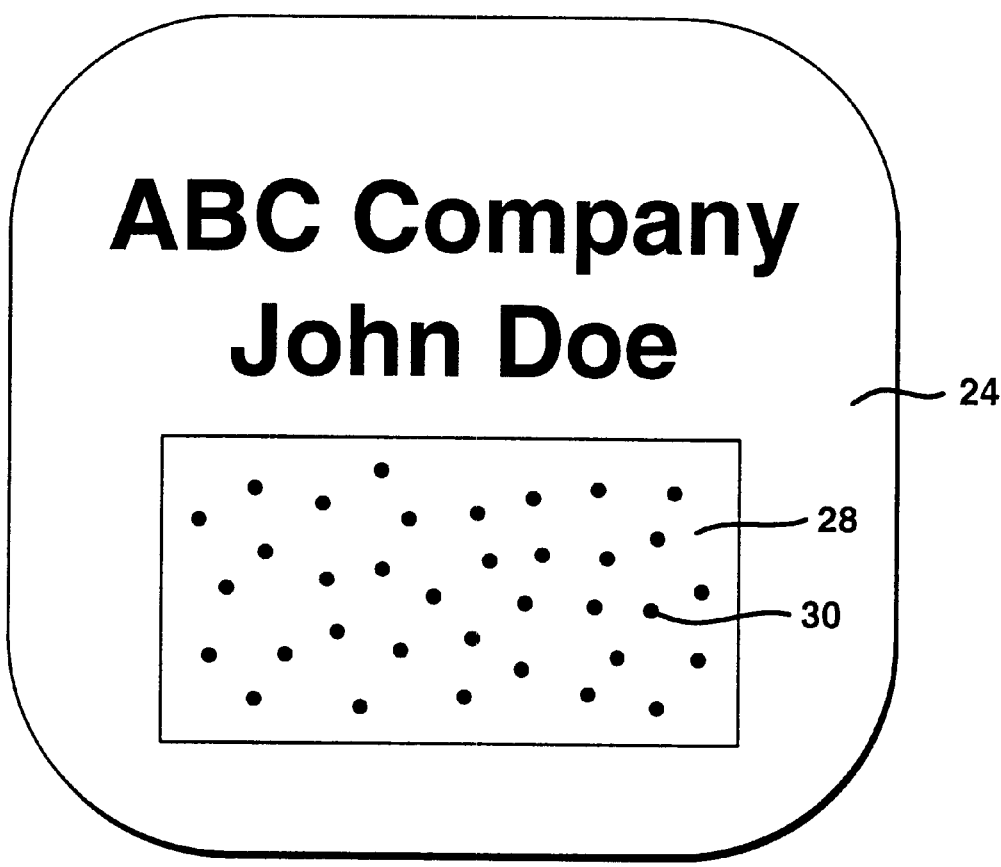
FIG. 2 shows a schematic of an identification badge that may be used in this invention.

Two types of viewing systems may be used with this invention. The first type system is a Sequential Laser Raster Scanning System and the other is Simultaneous CCTV Image Frame Freeze System. The invention, as contemplated in the description herein, requires that the area to be illuminated or scanned be the upper portion of a persons body as the person is moving through an entrance. This moving area represents approximately 1 square meter. Because of this large moving area, a sequential scan will see the same object from different angles and positions and will thus produce a signal which may be difficult to translate into useful information. Thus, it is highly desirable to capture this large area in a static fashion with a CCTV Image Frame-Freeze System. Thus, the description herein will be directed to a CCTV Image Frame-Freeze System. It should be understood, however, that either system may be used, as well as others not described herein.

Referring to the Figures, in the security system of this invention a CCTV camera 20 views each person entering a controlled area through, for example a doorway or hallway. Each person is wearing the security badge 24 of this invention. Badge 24 has a reflective surface 28 that has a predetermined reflective pattern 30 indicating a predetermined security status of the person wearing the badge.

A means is provided for illuminating the reflective surface of the badge with radiation, for example a predetermined wavelength of light. This may be accomplished by illuminating the badge with visible light. For example, a light source 22, preferably an infrared (IR) light source, for example, illuminates the entrance doorway. The IR source is invisible to the individual but illuminates the badge 24 that is attached to the person. The light reflects from the reflective surface 28.

Two types of reflective surfaces 28 having a predetermined reflective pattern 30 may be used with the security badge 24 of this invention. It should be understood, that either system may be used, as well as others not described herein. The first type surface is a surface that includes both dark and light areas on a white background that is illuminated by ambient light. The badge 24 can be printed with dark and light areas, such as a bar code or simple numbers like a license plate. The second type surface is a surface that includes a retroreflective area 28 illuminated by a light source 22 near the camera 20.

The invention, as contemplated in the description herein, requires that the area illuminated or scanned be about a one square meter moving field, and that the data to be decoded is included within the badge in a small area that must be scanned in a short time frame, i.e., the time required to process each person as they pass the point of observation. The camera 20 must scan this small area (e.g., 2 cm square) and decode it within a few milliseconds. Thus, if the badge 24 is printed with dark and light areas, e.g., such as a bar code or numbers, locating the pattern, particularly when there exists shadows produced by non-uniform lighting, may be a problem and may produce a signal which may be difficult to translate into useful information. Additionally, any type of printed security indicia, such as bar codes or numbers, that are visible, may be easily read or deciphered and may cause a security problem. Thus, it is desirable that the coding system that is used not be easily read or decoded by looking at the badge.

In order to overcome the problems associated with the first type system, it is thus highly desirable to use the second type surface, i.e., a retroreflective badge that contains encoded information in the reflective pattern 30 illuminated by a light source 22 near the camera 20. The retroreflective pattern 30 when illuminated by a light source 22 produces a target that is easy to find and enlarge by the camera 20. The retroreflective pattern 30 produces a bright spot in the camera 20 image frame that is easily analyzed. For example, as the badge 24 reflects the light illuminating the badge at the moment it passes the observation point, the camera 20 can be programmed to freeze the specific frame(s) that capture the bright area created by the reflection of the light from the retroreflective area and analyze the area for encoded data, i.e., the predetermined reflective pattern that indicates the predetermined security status. The reflective surface 28 thus can be, for example, a reflective metalized film, an embossed reflective metalized surface or a retroreflective surface. Retroreflective material may comprise a simple mirror but advantageously comprises a high-grain retroreflective material such as the glass-beaded material sold by the 3M Company under the trade name "ScotchLite" or the plastic comer-cube reflector material sold by the Rowland Corporation under the trade name "Reflexite". These latter materials are characterized by extremely high optical gains relative to a white card, gains in excess of 3000 being typical, and a wide acceptance angle, i.e., they tolerate a high degree of angular misalignment between the light source axis and the normal to the security card surface, which means that the alignment of the security card when scanning is less critical.

It is a characteristic of retroreflective materials that they reflect incident beams of light only back along the path of incidence. Consequently, the predetermined retroreflectively coated security badge 24 will reflect the light beam from light source 22 back in a predetermined direction. Because of this characteristic of retroreflective materials 30, light incident on the security badge 24 from extraneous sources will be returned thereto and will not be directed to the CCTV 20. Consequently, the CCTV will only sense light from the light source 22 which has been reflected from the security badge 24.

Two methods of encoding data in the predetermined retroreflective pattern 30 are contemplated herein. The first method is by the use of individual symbols, e.g., squares, circles, triangles to represent code numbers and letters. These symbols should be large enough to provide the resolution needed by the camera 20. For example, each number would be represented by a different symbol. Thus ten different symbols would be required. Each symbol should be an easily distinguished retroreflective shape or pattern. Thus, for example, a square represents the number 1, and a circle represents the number 2. By placing a retroreflective pattern of a circle followed by a square, the number 21 can be represented. If the square is followed by a square, the number becomes 22. These type symbols are easier to resolve than numbers because one is only detecting the outside edges of the symbol and edge identification of a symbols is much easier and more positive to identify than number characters. Moreover, edge identification of a symmetrical symbol has an automatic built-in redundancy because one only requires half of the symbol to specifically identify the symbol. In the future, when economical integrated chips for cameras have much higher resolution, then actual numbers can be uniquely resolved and used in this invention. Alternatively, the predetermined retroreflective pattern could be a retroreflective bar code so that each bar and space is basically the same as the next bar and space, and the sequence of bars and spaces is what produces the specific predetermined retroreflective pattern.

Since the CCTV must resolve the image of the predetermined retroreflective pattern from a distance of about 5 to 20 meters, the preferred system is the use of a retroreflective set of symbols or characters with each symbol or character representing a number between 0 and 9. A set of 4 digits would be sufficient to resolve ID numbers up to 9999, which under most circumstance would be adequate for most business locations. Additionally, a set of symbols for letters could be used to increase the potential distinct predetermined retroreflective patterns to the hundreds of thousands.

The symbol sizes are dependant on the resolution of the CCTV camera, and any software for resolving and magnifying the CCTV image to produce easily distinguishable characters. The final resolution, will also depend on the resolution of the CCTV camera chip since each pixel will define an edge of the symbol being resolved. In addition, each symbol/character could have a different degree of reflective intensity to thereby increase the information content of the reflective pattern.

Films made of with metalized retroreflective embossing are particularly easy to encode. Encoding the retroreflective film is done by heating areas of the film with a high intensity laser so that the reflective metal is converted to be non reflective, non-metal. The film turns dark (black) where it has been converted to the non-metal. The intense laser beam impinges on the reflective metal through the transparent polyester causing the aluminum metal to be heated heated and converted into aluminum oxide, leaving the polyester support film completely transparent. The back of the retroreflective material is normally coated with a protective dark coating, so in these transparent areas the film appears dark (black).

Encoding a pixel pattern on the film is relatively easy. One scans into a computer the pixel pattern, e.g., 5 pixels by 5 pixels, a matrix of 25 pixels. Defining a reflective area (white) as a 1 bit and a dark non-reflective area as a 0 bit, one can encode a binary pattern with 25 bits (pixels). Thus, the pixel pattern will program the high intensity laser beam to burn each pixel pattern into the film for encoding an appropriate number. This number can be as great as the pixel array permits. For a given size of retroreflective film that is used on the product, say 1 inch by 1 inch, one can program a 25 pixel array with each pixel being 4 to 5 millimeters square.

Furthermore, if one requires a larger size pixel for suitable resolution of the video cameras, one simply makes the retroreflective film area larger and the pixels bigger. In order that the number not be readily read, one simply make the encoded number a code so that the decoding algorithm in the computer unscrambles the coded pixel array. This means that the pixel array can be clear and visible to the naked eye and does not have to be camouflaged. Furthermore, since all reflective badges will be manufactured by the same process, all badges can have visible pixel arrays and are uniquely separated for each company that purchases them by the algorithm in the decoding computer.

In one embodiment of this invention the encoded security badges 24 are read by a retroreflective IR or visible light system and include an embossed metalized film which has retroreflective properties (typically comer cube reflector properties). In this embodiment, the retroreflective symbols are produced on the retroreflective film by means of a laser that burns the symbol into the reflective surface (hence, making it non-reflective) and thus, producing a reverse image of the symbol. This laser etching system can produce variable numbers (variable data) on the pre-embossed reflective film. It would be difficult to individually mechanically emboss numbers or symbols onto a reflective film. These symbols then reflect light into the camera lens and onto the camera photosensitive pixel chip, to produce an image of the symbols to be electronically read. These images can then be enlarged so that the image processing software can produce a recognizable security ID number, predetermined retroreflective pattern, for the badge.

A means is provided for detecting the reflected radiation from the predetermined reflective pattern 30 and producing a signal from the detected radiation that indicates the predetermined security status of the person wearing the badge. For example, as the individual enters the facility through the doorway being monitored, the identification badge 24 is illuminated, scanned, observed, and/or monitored by the CCTV camera 20 and the video image of the badge 24 immediately analyzed to confirm that they are wearing a valid identification badge 24. The CCTV camera 20 may be connected to an automated imaging system or processor 26. The imaging system 26 analyzes the signal from the CCTV camera 20 for the correct reflected image of the badge 24. If this correct reflective image is absent when a person appears the image processing system 26 will alert a security guard by some type of alarm, e.g., visual or sound alarm.

Alternatively, the CCTV camera 20 views the illuminated badge 24 with a reflective surface having a first predetermined reflective pattern indicating a first predetermined security status of the person wearing the badge. This first predetermined reflective pattern has the capability of changing to a second predetermined reflective pattern. This may be accomplished by, for example, by an electromagnetic energy source located outside of a specified area that radiates onto the reflective surface. Thus when someone leaves, for example, the building for the day, the first predetermined reflective pattern changes to the second predetermined reflective pattern. When this second predetermined reflective pattern is viewed, scanned, detected and analyzed by an image processor 26, the person's security status indicates that he has left the area.

In applicants' parent application, U.S. Ser. No. 08/718, 268 filed Sep. 20, 1996 entitled ELECTROCHEMICAL TIME INDICATOR (3.0-024), now U.S. Pat. No. 5,947,369, applicant describes other embodiments of a security badge wherein the first predetermined reflective pattern changes to a second predetermined reflective pattern over a predefined period of time, i.e., time dependant, due to the internal structure and electrochemical changes. The security badges described herein change from a first predetermined reflective pattern to a second predetermined reflective pattern by a means external to the security badge, e.g., electromagnetic radiation. Such external activation is not necessarily (but could be) time dependant.

In all cases an alert will be communicated to the security personnel if the person passing through the controlled area is not wearing a badge 24, the badge 24 is counterfeit, modified or not authentic, the badge 24 has been voided, or the badge 24 has been previously voided by a security officer after collection.

In still another embodiment, the identification system comprises the aforedescribed identification badge that is worn by a person. A means is provided, not only for illuminating the reflective surface of the badge, but for also illuminating the person. A means is provided for detecting the reflected radiation from the predetermined reflective pattern of the badge and for detecting the reflected radiation from the person due to a specific physical characteristic of the person wearing the badge. This detected radiation produces a signal that indicates the predetermined identification status of the badge and the person wearing the badge, as determined from the physical characteristic detected. It is envisioned that any one or a combination of physical characteristics may be detected, e.g., facial characteristics, height, body profile, skin color, hair color, length of arms, eye color, gender, and clothing color. Thus, the CCTV can incorporate images and characteristics of the person wearing the identification badge as a biometric identifier along with the badge identifier, e.g., number.

The security system of this invention permits a large facility to screen each and every person for a valid identification badge 24 by means of a distant-viewing, non-contacting, CCTV camera.

The system of this invention replaces the procedure wherein a guard physically examines all identification badges 24 passing his post. The system permits the controlled use of temporary identification badges 24 for short-term visitors, e.g., contractors, temporary staff In addition, the system may be used for those wearing long term, i.e., 1 or 2 year, identification badges 24, e.g., employee badges 24 which must be periodically renewed.

In the preferred embodiment, the identification badge 24 is permanently laminated or sealed in a clear plastic before issuing the badge 24. Various information may be printed on the badge 24, e.g., alphanumeric characters, bar codes, photographs and symbols. The preferred badge 24 has the same dimensions as a standard credit card.

It is understood that the embodiments described herein are merely exemplary and that a person skilled in the art may make many variations and modifications without departing from the spirit and scope of the invention. All such variations and modifications are intended to be included within the scope of the invention.

What is claimed is:

1. A security identification system comprising:
    an identification badge to be worn by a person, the person having a specific identifying physical characteristic, the identification badge comprising:
        a reflective surface of retro reflective film having a predetermined reflective pattern indicating a predetermined identification status of a person who should be wearing the badge; and
        an attachment means for attaching the badge to a person;
    a means for illuminating with visible light the reflective surface of the badge while the person is wearing the badge and moving and a means for illuminating with visible light the identifying physical characteristic of the person wearing the badge;
    a CCTV image frame-freeze system for detecting the reflected light from the predetermined reflective pattern on the badge and detecting the reflected light from the physical characteristic of the person wearing the badge;
    a means for producing a signal from the detected light from the badge and from the physical characteristic of the person wearing the badge that indicates the predetermined identification status of the badge and the identification of the person wearing the badge.

2. The system of claim 1, wherein the badge is illuminated by ambient light.

3. The system of claim 1, wherein the badge is illuminated with a predetermined wavelength of light.

4. The system of claim 1, wherein the illuminated specific physical characteristic of the person wearing the badge is facial characteristics.

5. The system of claim 1, wherein the illuminated specific physical characteristic of the person wearing the badge is height.

6. The system of claim 1, wherein the illuminated specific physical characteristic of the person wearing the badge is body profile.

7. The system of claim 1, wherein the illuminated specific physical characteristic of the person wearing the badge is skin color.

8. The system of claim 1, wherein the illuminated specific physical characteristic of the person wearing the badge is hair color.

9. The system of claim 1, wherein tie illuminated specific physical characteristic of the person wearing the badge are length of arms.

10. The system of claim 1, wherein the illuminated specific physical characteristic of the person wearing the badge is eye color.

11. The system of claim 1, wherein the illuminated specific physical characteristic of the person wearing the badge is gender.

12. The system of claim 1, wherein the illuminated specific physical characteristic of the person wearing the badge is clothing color.

* * * * *